United States Patent
Maruyama

(10) Patent No.: US 8,396,641 B2
(45) Date of Patent: Mar. 12, 2013

(54) INTER-VEHICLE DISTANCE CONTROL DEVICE

(75) Inventor: Tasuku Maruyama, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 362 days.

(21) Appl. No.: 12/662,872

(22) Filed: May 7, 2010

(65) Prior Publication Data

US 2010/0286887 A1 Nov. 11, 2010

(30) Foreign Application Priority Data

May 11, 2009 (JP) .............................. 2009-114833
May 6, 2010 (JP) .............................. 2010-106410

(51) Int. Cl.
*B60K 31/00* (2006.01)
(52) U.S. Cl. .......................................... 701/96; 701/93
(58) Field of Classification Search .................... 701/96, 701/93, 70, 30.4, 30.5, 29.3, 54, 301; 180/170
See application file for complete search history.

(56) References Cited

U.S. PATENT DOCUMENTS

| 6,311,121 B1* | 10/2001 | Kuragaki et al. | 701/96 |
| 2005/0187697 A1* | 8/2005 | Arai et al. | 701/96 |
| 2006/0265115 A1* | 11/2006 | Etori et al. | 701/96 |
| 2008/0125944 A1* | 5/2008 | Kamishima et al. | 701/54 |
| 2009/0005949 A1* | 1/2009 | Sugano | 701/96 |
| 2009/0135049 A1* | 5/2009 | Kikuchi | 342/70 |
| 2009/0164109 A1* | 6/2009 | Maruyama | 701/116 |

FOREIGN PATENT DOCUMENTS

JP 2008-1337 A 1/2008

* cited by examiner

*Primary Examiner* — Thomas Black
*Assistant Examiner* — Marthe Marc-Coleman
(74) *Attorney, Agent, or Firm* — McGinn IP Law Group, PLLC

(57) ABSTRACT

A preceding vehicle speed estimation unit estimates a preceding vehicle speed after a predetermined period of time based on a preceding vehicle speed and an acceleration of the preceding vehicle, and an ACC target vehicle speed setting unit sets a target vehicle speed for the vehicle following based on an inter-vehicle distance between the vehicle and preceding vehicle and the preceding vehicle speed after a predetermined period of time. Then, during the stop maintaining control, an ACC resetting acceptability determination unit compares the target vehicle speed and a reference threshold. When the target vehicle speed is greater than the reference threshold, it is determined to accept ACC resetting in response to the driver's input operation, and, when the target vehicle speed is equal to or less than the reference threshold, it is determined not to accept ACC resetting.

6 Claims, 5 Drawing Sheets

INTER-VEHICLE DISTANCE CONTROL DEVICE

CROSS-REFERENCE TO RELATED APPLICATIONS

The present application claims priority from Japanese Patent Application No. 2009-114833 filed on May 11, 2009 and Japanese Patent Application No. 2010-106410 filed on May 6, 2010, and is hereby incorporated by reference in their entirety.

BACKGROUND OF THE INVENTION

1. Field of the Invention

The present invention relates to an inter-vehicle distance control device that performs a vehicle following control by maintaining an inter-vehicle distance from a preceding vehicle.

2. Description of Related Art

In these days, regarding a vehicle such as a car, a technology to recognize an environment around the vehicle using a laser radar or the like and execute a security ensuring, a driving control, and the like has been developed. In particular, as a major practical application of the driving control, there is an automatic inter-vehicle distance control (adaptive cruise control: ACC) system for automatically controlling the vehicle speed or an inter-vehicle distance from a preceding vehicle based on the road condition recognized by the laser radar or the like.

In such an ACC system, when the preceding vehicle slows down and stops while the vehicle is following the preceding vehicle, the vehicle also slows down and stops. In this case, the vehicle following control is released and the operation is switched to a stop maintaining control to maintain the brake to keep the vehicle stopped. When the preceding vehicle starts to move during the stop maintaining control, a driver resets the vehicle following control by manually operating a switch or the like to automatically start the vehicle. This resetting releases the stop maintaining control and starts the vehicle in response to the start of the preceding vehicle.

Regarding the restart of a vehicle following control from a stop maintaining control by resetting the vehicle following control, for example, Japanese Patent Application Laid-Open (JP-A) No. 2008-1337 discloses a technology to disenable the stop maintaining control for a predetermined period of time after releasing the stop maintaining control in a case where the stop maintaining control is released and switched to a vehicle following driving control by operating a lever or the like to start the vehicle. The technology of JP-A No. 2008-1337 is to prevent a case where, when the vehicle following control is reset to start the vehicle but the increase in the vehicle speed is slow, it is determined by mistake that the vehicle is being stopped and the vehicle following control is switched to the stop maintaining control even though the vehicle is moving.

When a stop maintaining control is released and a vehicle following control is restarted, as a typical condition to reset the vehicle following control by accepting a manual operation by the driver, there are conditions where a preceding vehicle speed exceeds a predetermined threshold and a condition where an inter-vehicle distance from the preceding vehicle exceeds a predetermined threshold.

However, in the former condition related to the vehicle speed, resetting may be accepted even when the inter-vehicle distance is small. Thus when the preceding vehicle slows down immediately after the brake is released by resetting, the engine torque may not sufficiently be output and the vehicle may be slipped down backward on a slope or the like.

On the other hand, in the later condition related to the inter-vehicle distance, when the preceding vehicle quickly starts while the inter-vehicle distance is small, resetting is not accepted immediately and the timing of resetting is delayed. Accordingly, the driver may feel that the response is slow and driving comfortability may be deteriorated.

SUMMARY OF THE INVENTION

An object of the present invention is to provide an inter-vehicle distance control device that enables a restart of a vehicle following control according to a starting condition of a preceding vehicle when the preceding vehicle starts to move while the vehicle is in a stop maintaining control.

In order to achieve the object, the inter-vehicle distance control device according to the present invention captures a preceding vehicle in front of a vehicle installed the inter-vehicle distance control device and performs a vehicle following control as maintaining an inter-vehicle distance from the preceding vehicle. The inter-vehicle distance control device includes: a stop maintaining control unit configured to move an operation to a stop maintaining control that releases the vehicle following control and keeps a brake activation condition to maintain the vehicle stopped when the vehicle stops in response to a stop of the preceding vehicle; and a resetting acceptability determination unit configured to determine whether or not to accept resetting of the vehicle following control in response to the driver's operation based on an acceleration of the preceding vehicle and either of the inter-vehicle distance between the vehicle and the preceding vehicle or a vehicle speed of the preceding vehicle when the preceding vehicle starts to move during the stop maintaining control.

According to the present invention, when a preceding vehicle starts to move while a vehicle equipped with the inter-vehicle distance control device is in a stop maintaining control, whether or not to accept resetting of a vehicle following control in response to a driver's operation is determined based on starting conditions such as the acceleration of the preceding vehicle, the vehicle speed thereof and the inter-vehicle distance therefrom. Therefore, for example, when the preceding vehicle slowly starts to move while the inter-vehicle distance is small, resetting is not accepted until the inter-vehicle distance becomes a certain distance, and when the preceding vehicle quickly starts to move while the inter-vehicle distance is small, the vehicle following control is restarted in response to the starting condition of the preceding vehicle. Thus, the vehicle can start to move in accordance with the driver's intention.

DETAILED DESCRIPTION OF THE PREFERRED EMBODIMENTS

Hereinafter, embodiments of the present invention will be described with reference to the drawings.

Figure 1:
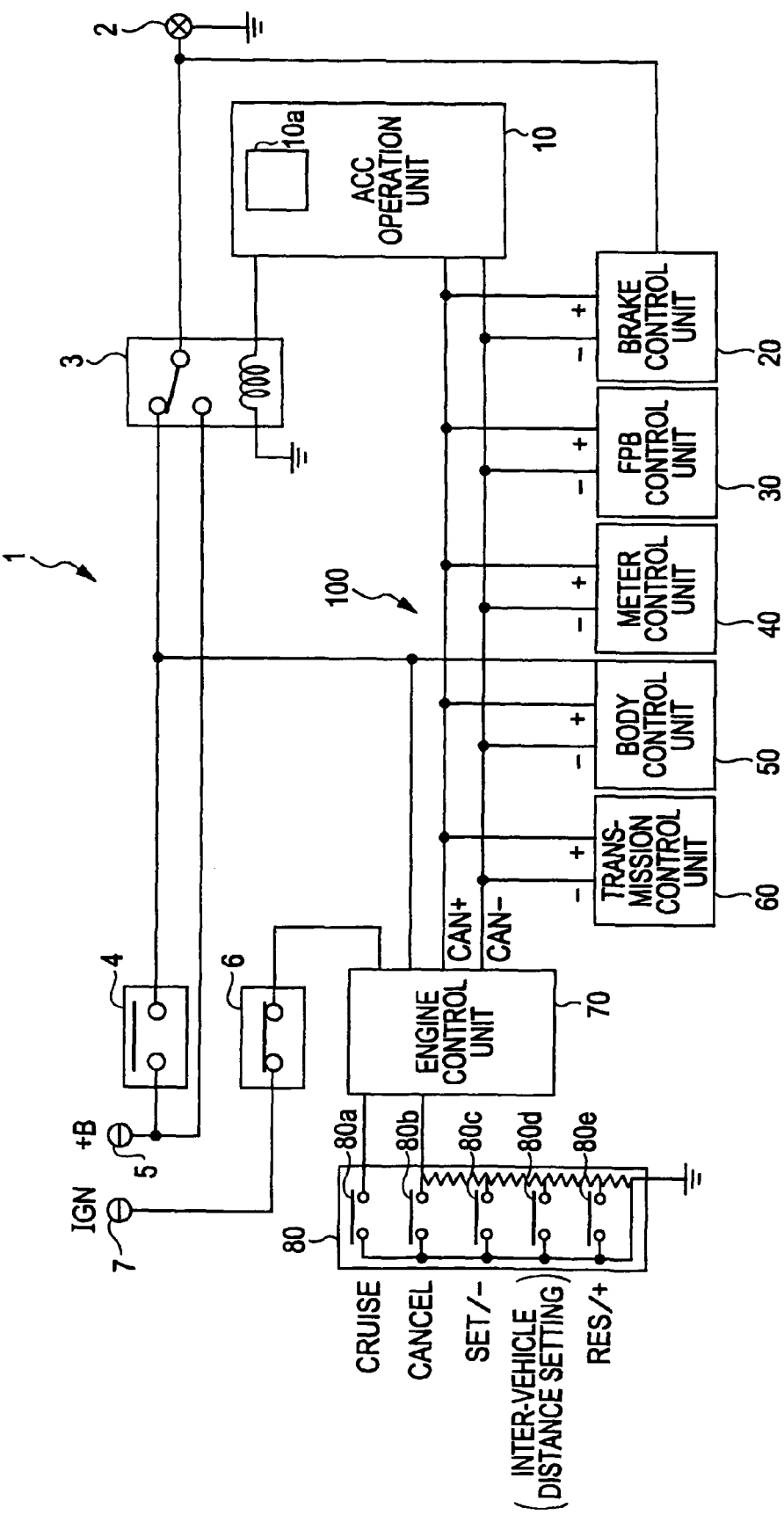
FIG. 1 is an overall configuration diagram of a cruise control system according to a first embodiment of the present invention.

An inter-vehicle distance control device according to a first embodiment of the present invention is formed as a cruise control system that uses a laser radar as a device for detecting an object such as a preceding vehicle which exists outside a vehicle and realizes various functions related to an adoptive cruise control (ACC) operation for automatically switching vehicle following and constant-speed driving according to a preceding vehicle acquisition result by the laser radar. More specifically, as shown in FIG. 1, a cruise control system 1 according to the present embodiment is composed of plural control units which are connected with one another via a network of CAN (controller area network) communication bus 100.

A main unit in the system is an ACC operation unit 10 integrally formed with a laser radar 10a. The ACC operation unit 10 is attached to a front bumper structural member of the vehicle. The laser light emitted from the laser radar 10a two-dimensionally scans a certain area in horizontal and vertical directions and distance information in each point in the two-dimensional area is obtained based on the time difference between transmitter waves and reception waves which are reflected by an external target. Based on the distance information, an inter-vehicle distance between the vehicle and a preceding vehicle, the preceding vehicle speed (relative vehicle speed) or the like is calculated.

The other control units forming the cruise control system 1 are a brake control unit 20 for controlling a brake, an EPB control unit 30 for controlling an activation and a release of an electrical parking brake (EPB), a meter control unit 40 for controlling screen displays of various displays, a body control unit 50 for controlling vehicle body system including power windows, seatbelts and doors, a transmission control unit 60 for controlling a transmission, and an engine control unit 70 for controlling an engine. These control units are network connected to the ACC control unit 10.

Further, a relay coil of a brake lamp relay 3 is connected to the ACC control unit 10 to turn on a brake lamp 2 when an automatic brake is activated during an ACC operation. In the brake lamp relay 3, a common terminal thereof is connected to the brake lamp 2, a normally-closed contact terminal thereof is connected to a battery power (+B) 5 via a brake lamp switch 4, and a normally-open contact terminal thereof is connected to the battery power 5. The brake lamp switch 4 is connected to a brake pedal (not shown) and has a contact that closes when the brake pedal is depressed.

In other words, in a non-ACC operation state, when a driver depresses the brake pedal, the brake lamp switch 4 is turned on and a voltage is applied from the battery power 5 to the brake lamp 2 via the normally-closed contact of the brake lamp relay 3 so that the brake lamp 2 is turned on. On the other hand, during an ACC operation, even when the brake lamp switch 4 is kept turned off, turning on and off of the brake lamp, 2 is controlled by the ACC operation unit 10 and, when an automatic brake is activated, the normally-open contact of the brake lamp relay 3 is closed and a voltage is applied from the battery power 5 to the brake lamp 2 so that the brake lamp 2 is turned on.

Here, in addition to the brake lamp switch 4, a brake lamp switch 6 having a contact that opens when the brake pedal is depressed is connected to the brake pedal. One terminal of the brake lamp switch 6 is connected to an ignition (IGN) switch 7 and the other terminal is connected to an input side of the engine control unit 70.

In the cruise control, the vehicle speed and inter-vehicle distance are set by a user by manually operating a command switch 80 connected to the engine control unit 70. The command switch 80 is an operation switch composed of a push switch and a toggle switch disposed in a steering system. The command switch 80 has a cruise switch 80a (shown as "CRUISE" in FIG. 1) as a main switch for tuning on and off of the activation of the ACC operation system, a cancel switch 80b (shown as "CANCEL" in FIG. 1) for releasing the ACC operation, a set switch 80c (shown as "SET/−" in FIG. 1) for setting the current vehicle speed thereof, an inter-vehicle distance set switch 80d for setting the inter-vehicle distance between the vehicle and a preceding vehicle, and a resume switch 80e (shown as "RES/+" in FIG. 1) for resetting a previously stored set vehicle speed.

When the cruise switch 80a is turned on, the information of the turned-on switch is sent to other control units via the CAN communication bus 100 from the engine control unit 70, and the system becomes operation state. In this case, the meter control unit 40 turns on the display of "CRUISE" on a display in an instrument panel to indicate the condition of the ACC operation system to the driver.

The display indicating the condition of the ACC operation system serves as a multifunctional display including a text display such as "READY" indicting a standby condition of the ACC operation, "SET" indicating that the vehicle speed and the like have been set via the command switch 80 in addition to "CRUISE," a graphic display indicating a condition of a captured preceding vehicle and a set inter-vehicle distance, and a numerical value display indicating a set vehicle speed and the like.

The ACC operation unit 10 transmits and receives information to and from the control units 20, 30, 40, 50 and 70 via the CAN communication bus 100 and mainly performs a throttle control via the engine control unit 70, a shift control via the transmission control unit 60 and a brake control via the brake control unit 20 to maintain a vehicle speed or an inter-vehicle distance set by the driver.

In other words, the ACC operation unit 10 automatically switches between constant-speed driving to drive at a set vehicle speed set by the driver and vehicle following to drive following the preceding vehicle at the set vehicle speed in maximum according to a presence or absence of a preceding vehicle detected by the laser radar 10a. During vehicle following to drive following a preceding vehicle, a target vehicle speed in an ACC operation is calculated based on an inter-vehicle distance between the vehicle itself and the preceding vehicle, a relative velocity and an acceleration of the preceding vehicle. This target vehicle speed is calculated, for example, based on a map that uses at least the inter-vehicle distance and the relative velocity as axes, and the calculated target vehicle speed is transmitted to the engine control unit 70. The engine control unit 70 executes a throttle control corresponding to a deviation between the target vehicle speed and the current vehicle speed to control the vehicle speed to be relevant to the target vehicle speed.

Further, when it is determined that the inter-vehicle distance cannot be maintained (the vehicle approaches too close to the preceding vehicle) by using a throttle OFF brake force (engine brake) in a condition that the road gradient is a downslope and the gear is kept in a current position, a target gear position is transmitted from the ACC operation unit 10 to the transmission control unit 60. The transmission control unit 60 executes a shift down control to the target gear position and maintains the inter-vehicle distance.

Further, the ACC operation unit 10 calculates a request deceleration of the vehicle based on the inter-vehicle distance between the vehicle and the preceding vehicle, the relative velocity, and a deceleration of the preceding vehicle, calculates a brake fluid pressure required to generate the request deceleration, and transmits the calculation result as a request liquid pressure to the brake control unit 20. The brake control unit 20 controls the fluid pressure of the brake system based on the request fluid pressure and decelerates the vehicle by generating necessary deceleration.

During such an ACC operation, when the vehicle stops in response to a stop of the preceding vehicle (the vehicle speed becomes "zero"), the control shifts to a stop maintaining control to maintain the brake fluid pressure to keep the vehicle stopped and the preceding vehicle following control is released. When the preceding vehicle starts to move while the vehicle is in the stop maintaining control and the vehicle also starts to move in response to the start of the preceding vehicle, the driver has to depress an accelerator pedal to start the vehicle or release the brake by operating the set switch 80c or the resume switch 80e to restart the ACC operation.

In this system, in a case where the driver operates the switch to restart the ACC operation (ACC resetting), the ACC operation function does not simply become effective even when the vehicle speed of the preceding vehicle or the inter-vehicle distance exceeds a threshold (disenabling ACC resetting), differently from conventional examples. This is because, in a case where the resetting is simply accepted based on the vehicle speed of the preceding vehicle, if resetting is executed while the inter-vehicle distance is small and the preceding vehicle slows down immediately after the vehicle releases the brake, engine torque is not sufficiently output at a uphill slope, for example, and the vehicle may slip down backward. Further, in a case where the resetting is simply accepted based on the inter-vehicle distance from the preceding vehicle, if the preceding vehicle suddenly rushes to start while the inter-vehicle distance is small, there may be a delay to accept resetting and this deteriorates driving comfortability due to a slow response.

Figure 2:
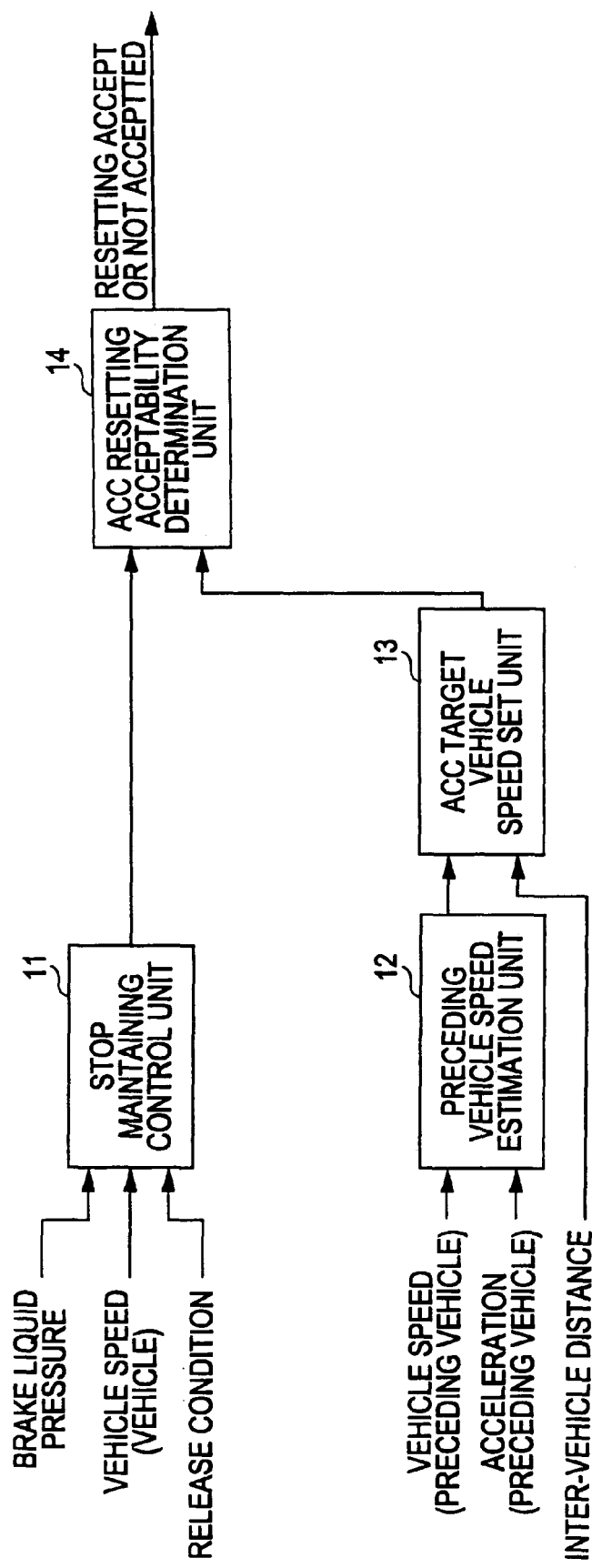
FIG. 2 is a functional block diagram related to ACC resetting according to the first embodiment of the present invention.

Thus, the system has, as functions related to ACC resetting during a stop maintaining control by the ACC, a stop maintaining control unit 11, a preceding vehicle speed estimation unit 12, an ACC target vehicle speed setting unit 13 and an ACC resetting acceptability determination unit 14, as shown in FIG. 2. Here, in the present embodiment, these functional units are included in the ACC operation unit 10; however, the respective control units may be separately provided to the ACC control unit 10 and the engine control unit 70 which are connected via the network so that the functions are shared.

When the preceding vehicle slows down and stops during vehicle following by the ACC operation and the vehicle also slows down and stops, the stop maintaining control unit 11 instructs to execute a stop maintaining control by maintaining the brake fluid pressure to be a pressure to keep the vehicle stopped. On the other hand, during the stop maintaining control, for example, the stop maintaining control is released when the following situations of (1) to (6) occur:

(1) A predetermined period of time has passed after the stop maintaining control started.

In this case, the request for a brake fluid pressure is released and the EPB is activated at the same time.

(2) The transmission range is shifted to a parking range.

(3) The cruise switch 80a is turned off.

(4) The EPB is activated.

Even if a predetermined period of time has not passed from the start of the stop maintaining control, if the body control unit 50 detects that a door is open or a seatbelt is released, and the information is notified via the network, the stop maintaining control is released and the EPB is activated to ensure security.

(5) The cancel switch 80b is operated.

(6) The driver operates the accelerator while the transmission is in the drive range or reverse range.

(7) The driver operates the brake.

(8) The ACC (vehicle following control) is set.

When the setting of the ACC operation (vehicle following control) is made effective by the input operation via the set switch 80c or the resume switch 80e, the stop maintaining control is released.

When the vehicle is following the preceding vehicle or the preceding vehicle starts to move in a stop state, the preceding vehicle speed estimation unit 12 calculates the current vehicle speed and acceleration of the preceding vehicle based on measurement data of the laser radar 10a and estimates a preceding vehicle speed after a predetermined period of time based on the calculated vehicle speed and acceleration of the preceding vehicle. The preceding vehicle speed estimation result is transmitted to the ACC target vehicle speed setting unit 13. As described below, even when the preceding vehicle starts during a stop maintaining control of the vehicle, a preceding vehicle speed after a predetermined period of time is estimated and the target vehicle speed is calculated based on the estimated vehicle speed.

The ACC target vehicle speed setting unit 13 sets the target vehicle speed of the ACC operation according whether or not there is a preceding vehicle. When the laser radar 10a is not detecting any preceding vehicle, the set vehicle speed set by the driver is set as a target vehicle speed. When a preceding vehicle is being detected, the target vehicle speed of vehicle following is set based on at least the inter-vehicle distance from the preceding vehicle and the vehicle speed thereof. Note that when the preceding vehicle starts during a stop maintain control, the target vehicle speed is set based on the estimated preceding vehicle speed estimated by the preceding vehicle speed estimation unit 12, whether or not the vehicle following control is performed. In addition, an upper limit of the target vehicle speed of vehicle following is the set vehicle speed.

During the execution of the stop maintaining control by the stop maintaining control unit 11, the ACC resetting acceptability determination unit 14 receives driver's input operation via the set switch 80c or resume switch 80e and determines whether to accept ACC resetting or invalidate the switch operation input not to accept ACC resetting. The acceptability (accept/not accept) of ACC resetting is determined by comparing the target vehicle speed of vehicle following set by the ACC target vehicle speed setting unit 13 with a predetermined reference threshold. When the target vehicle speed is greater than the reference threshold, ACC resetting is accepted and, when the target vehicle speed is equal to or less than the reference threshold, ACC resetting is not accepted.

In a resetting acceptability determination in this system, when a preceding vehicle slowly starts to move while the inter-vehicle distance is small, resetting is not accepted until the inter-vehicle distance becomes a certain distance and the vehicle may not slip down backward on a slope due to a brake release' and a lack of output torque. Further, when the preceding vehicle quickly starts to move while the preceding vehicle is close to the vehicle, since the acceleration of the preceding vehicle is reflected to the target vehicle speed, resetting is accepted and the vehicle can start smoothly. Further, when the preceding vehicle is away from the vehicle, this enables resetting.

In other words, since resetting acceptability is determined by using a target vehicle speed reflecting the preceding vehicle's acceleration and the inter-vehicle distance, it is possible to judge exactly "when the driver wants to release the brake and start to move." Further, since the ACC target vehicle speed itself is used, acceleration is surely controlled when the brake is released so that the vehicle does not slip down backwards on a slope or the like.

Note that as a condition to determine acceptability of ACC resetting, a steering angle may be used in addition to the target vehicle speed. In other words, during a stop maintaining control, if the driver turns a steering wheel and forgets the steering operation, the vehicle may start to move and make a turn in an unexpected direction when ACC resetting is accepted and the brake is automatically released. Thus, during the stop maintaining control, even if the target vehicle speed is greater than the reference threshold, ACC resetting is not accepted if a steering angle is greater than a predetermined value to ensure security.

Further, when the ACC is reset and the vehicle starts to move, it is preferable that the engine torque is gradually increased as releasing the brake, instead of that the engine torque is output at the timing of releasing the brake. In other words, to prevent the vehicle from slipping down backward or any direction on a slope or the like, the engine torque tends to be output abruptly so that the vehicle may be shaken and the driver may feel uncomfortable.

Thus, during the stop maintaining control, in a case where the gradient of the slope is estimated and the estimated slope gradient is equal to or greater than a predetermined value, at a start by resetting ACC, the brake fluid pressure is reduced step by step at a time change rate corresponding to the slop gradient estimation result and, at the same time, drive torque is output so as to counter the brake force as assuming that the brake is not applied. As a result, the acceleration is controlled while the brake is being released so that the drive torque of the engine gradually increases as the braking force of the brake is being reduced. This allows a smooth action for starting the vehicle.

Figure 3:
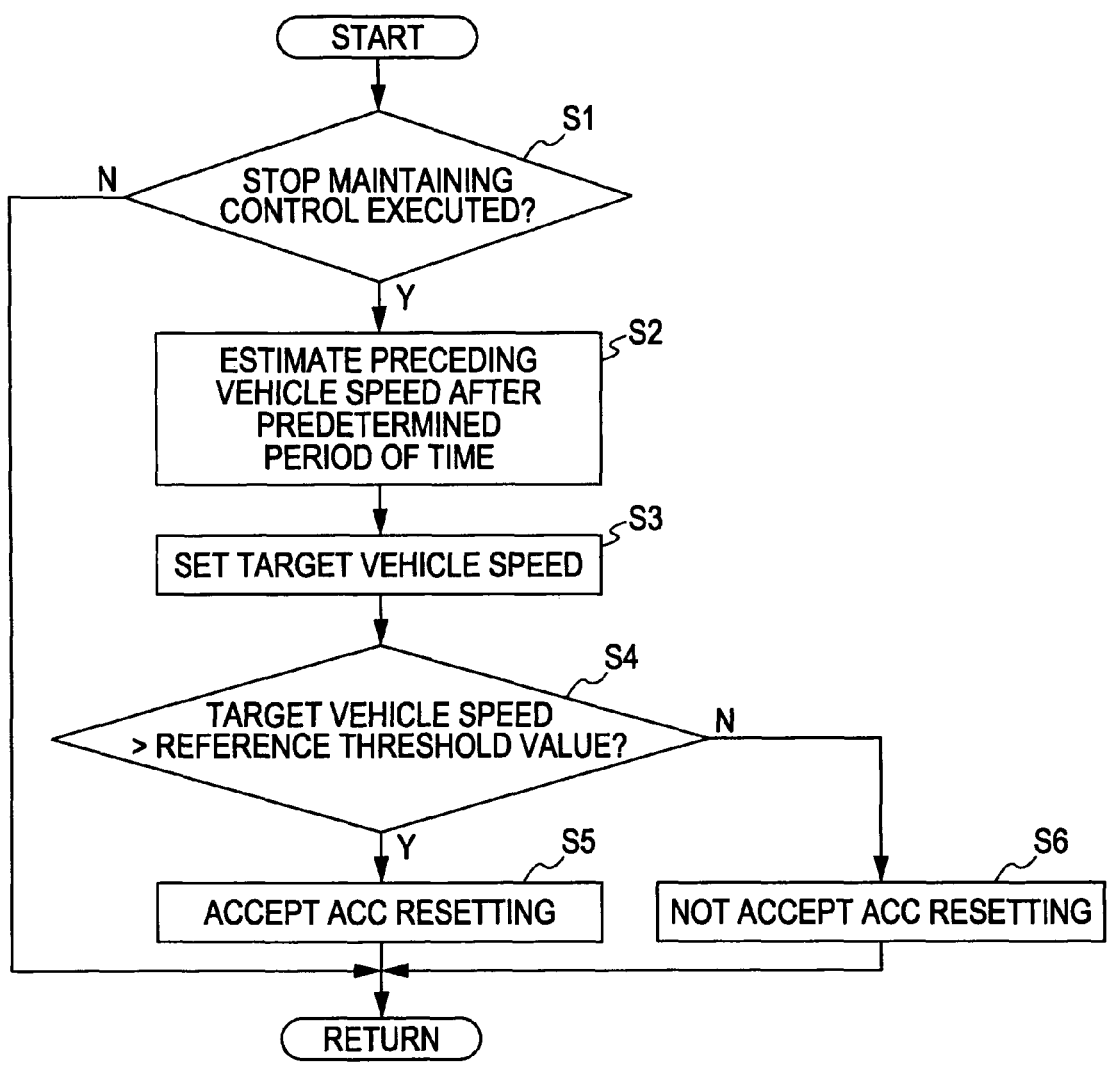
FIG. 3 is a flowchart of an ACC resetting process according to the first embodiment of the present invention;.

Next, program processing related to the ACC resetting acceptability determination will be explained with reference to the flowchart of FIG. 3.

In the ACC resetting acceptability determination process, firstly in step S1, the vehicle stops in response to a stop of a preceding vehicle and it is determined whether or not a stop maintaining control is being executed. Then, when the stop maintaining control is not being executed, the process ends. When the ACC stop maintaining control is being executed, on the other hand, the process proceeds to step S2 to estimate the preceding vehicle speed after a predetermined period of time.

Next, the process proceeds to step S3, and a target vehicle speed VTGTacc of an ACC operation (when restarting the ACC operation) is set based on the inter-vehicle distance from the preceding vehicle and the preceding vehicle speed after predetermined period of time. Then, in step S4, the target vehicle speed VTGTacc is compared with a predetermined reference threshold Vhold and it is determined whether or not the target vehicle speed VTGTacc is greater than the reference threshold Vhold.

Then, when VTGTacc is greater than Vhold, the process proceeds from step S4 to step S5 to accept ACC resetting and the process ends. When ACC resetting is accepted, input operation via the set switch 80c or resume switch 80e becomes acceptable. For example, the resume switch 80e is pressed when the display for ACC in the instrument panel is "READY," the previously set vehicle speed is set so that the vehicle can start to move smoothly in response to a start of the preceding vehicle.

On the other hand, when VTGTacc is equal to or smaller than Vhold in step S4, the process branches form step S4 to step S6 not to accept ACC resetting and the process ends. In this case, even when the set switch 80c or resume switch 80e is pressed, the input operation is invalid so that the brake is not released even when the preceding vehicle slowly starts while the inter-vehicle distance is small. As a result, it is possible to surely prevent the vehicle from slipping down or the like on a slope due to a lack of engine torque.

As described above, according to the present embodiment, when a preceding vehicle starts during a stop maintaining control of the vehicle, ACC resetting acceptability is determined based on a target vehicle speed reflecting an acceleration of the preceding vehicle and an inter-vehicle distance. Thus, vehicle following control is restarted according to the start condition of the preceding vehicle and the vehicle can be started as the driver desires.

In the first embodiment and a second embodiment to be described below, a threshold for determining the acceptability of ACC resetting is defined by considering vehicle characteristics and evaluation test results of driver's feelings, for example.

Next, the second embodiment of the present invention will be described. The second embodiment determines the acceptability of ACC resetting directly based on the vehicle speed and acceleration of the preceding vehicle or the acceleration thereof and inter-vehicle distance therefrom, without using the target vehicle speed for the ACC operation.

Figure 4:
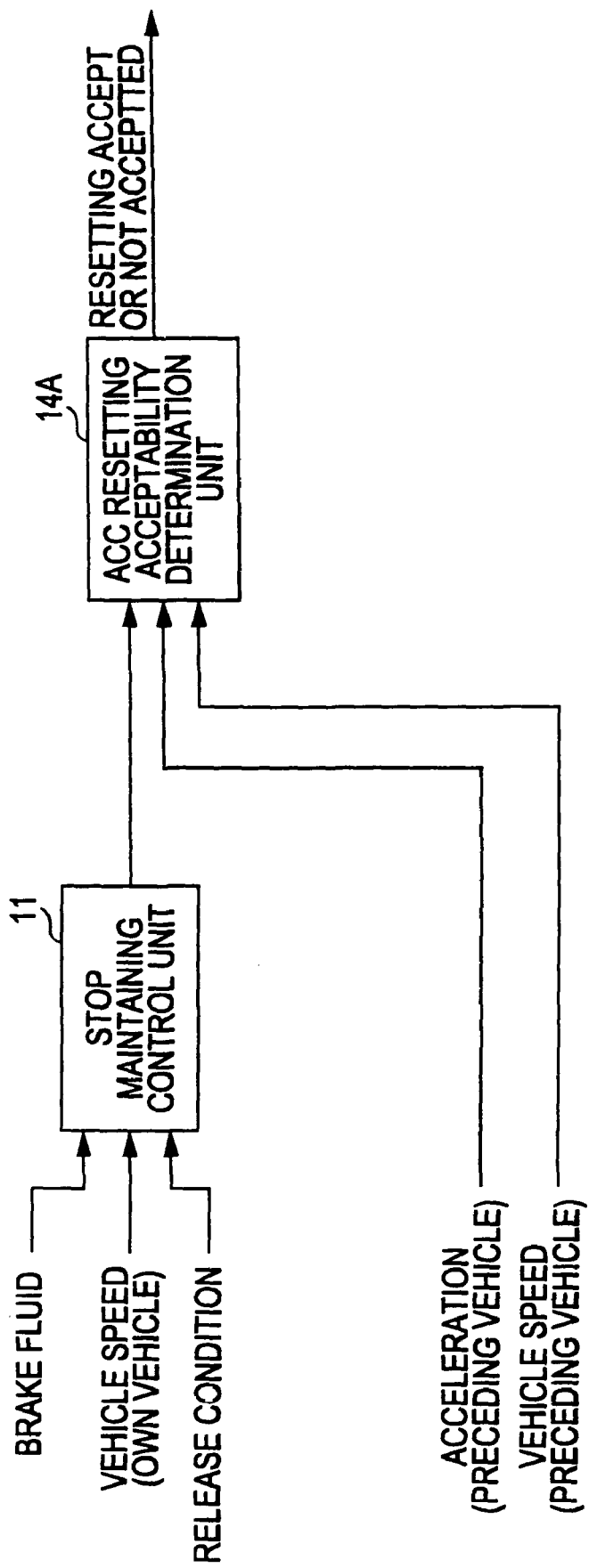
FIG. 4 is another functional block diagram related to ACC resetting according to a second embodiment of the present invention.
Figure 5:
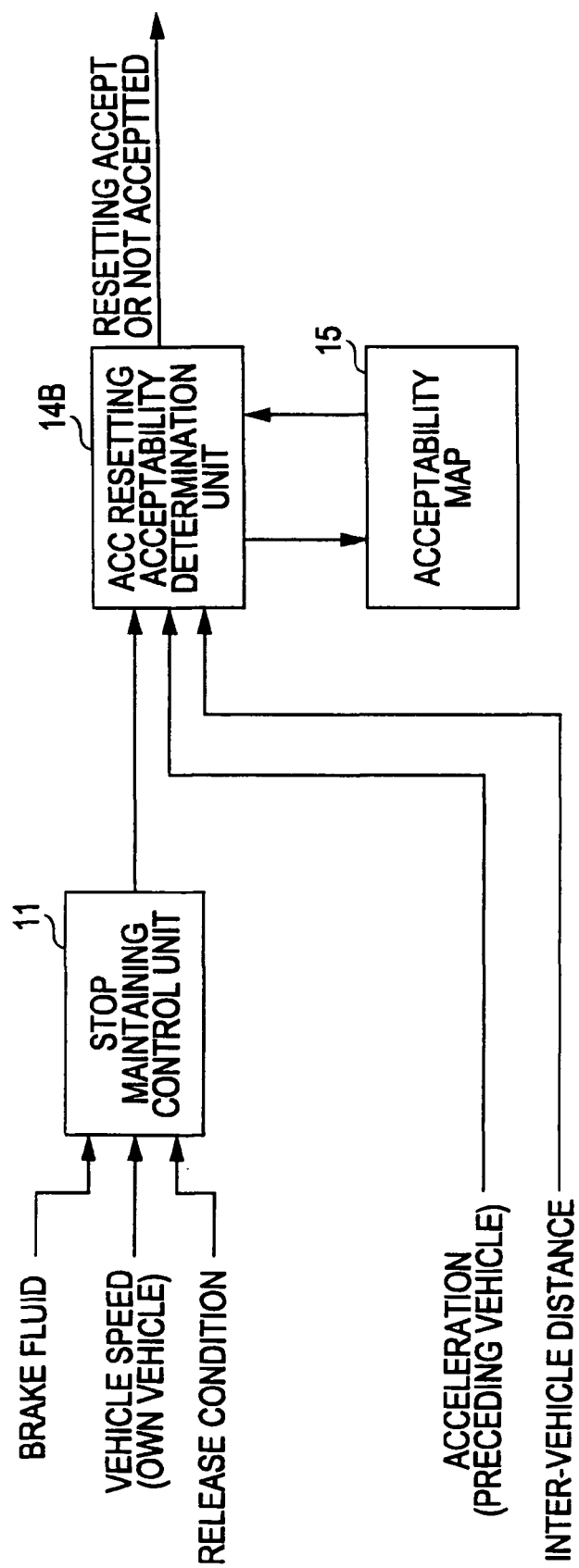
FIG. 5 is a functional block diagram related to ACC resetting according to the second embodiment of the present invention.

Therefore, functions related to ACC resetting of the ACC control unit 10 have been slightly changed in the second embodiment compared to the first embodiment, and configured as shown in FIGS. 4 and 5. Other configurations are same as the first embodiment.

Firstly, a description will be made for an example of determining the acceptability of ACC resetting based on the vehicle speed and acceleration of the preceding vehicle shown in FIG. 4. In the example shown in FIG. 4, the preceding vehicle speed estimation unit 12 and ACC target vehicle speed setting unit 13 explained in the first embodiment are not used, and instead an ACC resetting acceptability determination unit 14A determines the acceptability of ACC resetting, the ACC resetting acceptability determination unit which has slightly different functions from the ACC resetting acceptability determination unit 14.

Specifically, when the preceding vehicle starts to move during the stop maintaining control being performed in the vehicle, the ACC resetting acceptability determination unit 14A determines the acceptability of ACC resetting by comparing the vehicle speed and acceleration of the preceding vehicle calculated from data measured by the laser radar 10a with a vehicle speed determination threshold Vset and an acceleration determination threshold Aset respectively. When the preceding vehicle speed exceeds the vehicle speed determination threshold Vset and the preceding vehicle acceleration exceeds the acceleration determination threshold Aset, ACC resetting is accepted. When at least one of the vehicle speed and acceleration of the preceding vehicle equal to or less than the own threshold, ACC resetting is not accepted.

With this determination of the ACC resetting acceptability based on the vehicle speed and acceleration of the preceding vehicle, it is possible to judge exactly "when the driver wants to release the brake and start to move." More specifically, when the preceding vehicle slowly starts to move while the inter-vehicle distance is small, resetting is not accepted until the vehicle speed and acceleration of the preceding vehicle become large at some level and accordingly the inter-vehicle distance becomes a certain distance, and the vehicle may not slip down backward on a slope due to a brake release and a lack of output torque. On the other hand, when the preceding vehicle quickly starts to move while the preceding vehicle is close to the vehicle, resetting is immediately accepted based on the vehicle speed and acceleration of the preceding vehicle and the vehicle can start smoothly.

In this case, the ACC resetting acceptability may be determined as shown in FIG. 5. In the example shown in FIG. 5, the ACC resetting acceptability determination unit 14A has been replaced by an ACC resetting acceptability determination unit 14B, the ACC resetting acceptability is determined based on whether or not the acceleration of the preceding vehicle and the inter-vehicle distance therefrom satisfy a predetermined condition.

Specifically, when the preceding vehicle starts to move, the ACC resetting acceptability determination unit 14B determines the acceptability of ACC resetting by referring to an acceptability map 15 using the acceleration of the preceding vehicle and the inter-vehicle distance therefrom as parameters. The acceptability map 15 contains an acceptability judgment value based on the acceleration of the preceding vehicle and the inter-vehicle distance therefrom and is set such that an acceleration value required for ACC resetting becomes large as the inter-vehicle distance becomes small, and becomes small as the inter-vehicle distance becomes large. In other words, when the acceleration of the preceding vehicle is small, the inter-vehicle distance is set to be longer compared to a case in which the acceleration of the preceding vehicle is larger. On the other hand, when the acceleration of the preceding vehicle is large, the inter-vehicle distance is set to be shorter compared to a case in which the acceleration of the preceding vehicle is smaller.

More simply, the acceleration of the preceding vehicle may be used as a first priority requirement: when the acceleration of the preceding vehicle exceeds a predetermined acceleration determination threshold Aset', ACC resetting may be accepted. When the acceleration of the preceding vehicle is equal to or less than the predetermined acceleration determination threshold Aset', ACC resetting may be accepted at a timing when the inter-vehicle distance exceeds a predetermined determination threshold Dset.

Even in the determination of the ACC resetting acceptability based on the acceleration of the preceding vehicle and the inter-vehicle distance therefrom, when a preceding vehicle slowly starts to move, resetting is not accepted until the inter-vehicle distance becomes a certain distance. When the preceding vehicle quickly starts to move, resetting is immediately accepted. Thus, like the first embodiment and the above determination by ACC resetting acceptability determination unit 14A, the vehicle following control is restarted according to the start condition of the preceding vehicle and the vehicle can be started as the driver desires.

What is claimed is:

1. An inter-vehicle distance control device that captures a preceding vehicle in front of a vehicle having installed therein the inter-vehicle distance control device and performs a vehicle following control as maintaining an inter-vehicle distance from the preceding vehicle, the inter-vehicle distance control device comprising:
a stop maintaining control unit configured to move an operation to a stop maintaining control that releases the vehicle following control and keeps a brake activation condition to maintain the vehicle stopped when the vehicle stops in a response to a stop of the preceding vehicle;
a resetting acceptability determination unit configured to determine whether to accept resetting of the vehicle following control in a response to a driver's operation based on an acceleration of the preceding vehicle and one of the inter-vehicle distance between the vehicle and the preceding vehicle, and a vehicle speed of the preceding vehicle when the preceding vehicle starts to move during the stop maintaining control:
a target vehicle speed setting unit configured to set a target vehicle speed of the vehicle following control based on at least the inter-vehicle distance between the vehicle and the preceding vehicle and the vehicle speed of the preceding vehicle; and
a preceding vehicle speed estimation unit configured to estimate the vehicle speed of the preceding vehicle after a predetermined period of time based on the acceleration of the preceding vehicle and to output the estimated vehicle speed of the preceding vehicle as the vehicle speed of the preceding vehicle to the target vehicle speed setting unit,
wherein, when the preceding vehicle starts to move during the stop maintaining control, the resetting acceptability determination unit compares the target vehicle speed set based on the estimated vehicle speed with a predetermined threshold and determines whether to accept resetting of the vehicle following control in the response to the driver's operation.

2. The inter-vehicle distance control device according to claim 1, wherein the target vehicle speed setting unit is further configured to set the target vehicle speed of the vehicle following control based on the acceleration of the preceding vehicle.

3. The inter-vehicle distance control device according to claim 1, wherein the preceding vehicle speed estimation unit is further configured to estimate the vehicle speed of the preceding vehicle based on a calculation of a current vehicle speed of the preceding vehicle.

4. The inter-vehicle distance control device according to claim 1, wherein the preceding vehicle speed estimation unit calculates a current vehicle speed of the preceding vehicle and the acceleration of the preceding vehicle based on a measurement of the inter-vehicle distance between the vehicle and the preceding vehicle.

5. An inter-vehicle distance control device that captures a preceding vehicle in front of a vehicle having installed therein the inter-vehicle distance control device and performs a vehicle following control as maintaining an inter-vehicle distance from the preceding vehicle, the inter-vehicle distance control device comprising:
a stop maintaining control unit configured to move an operation to a stop maintaining control that releases the vehicle following control and keeps a brake activation condition to maintain the vehicle stopped when the vehicle stops in a response to a stop of the preceding vehicle; and
a resetting acceptability determination unit configured to determine whether to accept a resetting of the vehicle following control in a response to a driver's operation based on an acceleration of the preceding vehicle and one of the inter-vehicle distance between the vehicle and the preceding vehicle, and a vehicle speed of the preceding vehicle when the preceding vehicle starts to move during the stop maintaining control, wherein the resetting acceptability determination unit determines an acceptability of an adaptive cruise control (ACC) resetting based on the vehicle speed and the acceleration of the preceding vehicle when the preceding vehicle starts to move, and wherein the resetting of the vehicle following control is accepted when the vehicle speed of the preceding vehicle speed exceeds a vehicle speed determination threshold and the acceleration of the preceding vehicle exceeds an acceleration determination threshold.

6. An inter-vehicle distance control device that captures a preceding vehicle in front of a vehicle having installed therein the inter-vehicle distance control device and performs a vehicle following control as maintaining an inter-vehicle distance from the preceding vehicle, the inter-vehicle distance control device comprising:

a stop maintaining control unit configured to move an operation to a stop maintaining control that releases the vehicle following control and keeps a brake activation condition to maintain the vehicle stopped when the vehicle stops in a response to a stop of the preceding vehicle; and a resetting acceptability determination unit configured to determine whether to accept resetting of the vehicle following control in a response to a driver's operation based on an acceleration of the preceding vehicle and one of the inter-vehicle distance between the vehicle and the preceding vehicle, and a vehicle speed of the preceding vehicle when the preceding vehicle starts to move during the stop maintaining control, wherein the resetting acceptability determination unit determines an acceptability of an adaptive cruise control (ACC) resetting based on the vehicle speed and the acceleration of the preceding vehicle and the inter-vehicle distance between the preceding vehicle and the vehicle when the preceding vehicle starts to move, and wherein, when the acceleration of the preceding vehicle is more than a predetermined value, the inter-vehicle distance between the preceding vehicle and the vehicle for accepting resetting of the vehicle following control is set to be shorter compared to a case in which the acceleration of the preceding vehicle is less than the predetermined value.

* * * * *